United States Patent
Yi (10) Patent No.: US 7,352,361 B2
(45) Date of Patent: Apr. 1, 2008

(54) DISPLAY DEVICE FOR A PORTABLE TERMINAL CAPABLE OF DISPLAYING AN ADAPTIVE IMAGE

(75) Inventor: Jong-jin Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 10/839,248

(22) Filed: May 6, 2004

(65) Prior Publication Data

US 2005/0044510 A1 Feb. 24, 2005

(30) Foreign Application Priority Data

Aug. 11, 2003 (KR) .................. 10-2003-0055299

(51) Int. Cl.
*G09G 5/08* (2006.01)
(52) U.S. Cl. .................. 345/158; 345/2.1; 345/2.2; 345/2.3; 345/166; 345/204
(58) Field of Classification Search ................ 345/158, 345/166, 2.1, 2.2, 2.3, 204
See application file for complete search history.

(56) References Cited

U.S. PATENT DOCUMENTS 6,115,025 A * 9/2000 Buxton et al. .............. 345/659
6,334,063 B1 12/2001 Charlier et al.
7,148,911 B1 * 12/2006 Mitsui et al. ............. 348/14.01
2002/0033836 A1 3/2002 Smith
2005/0156882 A1 * 7/2005 Manchester ................. 345/158

FOREIGN PATENT DOCUMENTS

| EP | 1 445 920 A2 | 8/2004 |
|---|---|---|
| JP | 63-217285 A | 9/1988 |
| JP | 11-231987 A | 8/1999 |
| JP | 2000-122635 A | 4/2000 |
| JP | 2001-242845 A | 9/2001 |
| JP | 2003-216135 A | 7/2003 |
| KR | 2001-0000127 A | 1/2001 |

* cited by examiner

*Primary Examiner*—Richard Hjerpe
*Assistant Examiner*—Leonid Shapiro
(74) *Attorney, Agent, or Firm*—Sughrue Mion, PLLC (57) ABSTRACT

A display device for a portable terminal displays an adaptive image in accordance with a position of a user. The display device includes a display unit, a slope detection unit for detecting a slope of the display unit that is rotating in one direction among front, rear, right and left directions from its upright position, an image processing unit for processing an image to be displayed on the display unit, and a control unit for rotating the image processed by the image processing unit in accordance with the slope of the display unit detected by the slope detection unit, and displaying the rotating image on the display unit. The display device can display an image to match the viewing angle of the user in accordance with the position of the user who views the display unit, and thus the convenience of the user of the portable terminal is maximized.

22 Claims, 7 Drawing Sheets

DISPLAY DEVICE FOR A PORTABLE TERMINAL CAPABLE OF DISPLAYING AN ADAPTIVE IMAGE

CROSS-REFERENCE TO RELATED APPLICATIONS

This application claims the benefit of Korean Patent Application No. 2003-55299 filed Aug. 11, 2003, in the Korean Intellectual Property Office, the disclosure of which is incorporated herein by reference.

BACKGROUND OF THE INVENTION

1. Field of the Invention

An apparatus consistent with the present invention relates to a display device for a portable terminal, and more particularly to a display device for a portable terminal which can display an adaptive image for a user's convenience.

2. Description of the Related Art

With the development of digital technology, functions of electronic appliances have been diversified, and the miniaturization of such electronic appliances has been on an increasing trend for a user's convenience in carrying the electronic appliances. Among electronic appliances, a small-sized electronic appliance that can transmit/receive data is called a portable terminal, such as a PDA (Personal Digital Assistant), a PPC (Palm-sized PC), an HPC (Hand-held PC), a lap-top computer, a cellular phone, etc. Other examples of portable terminals include an electronic pocketbook, a digital camera, and a video camera.

Especially, a portable terminal such as a cellular phone, a PDA, a PPC, etc., can transmit/receive text data, a photograph and an image, such as a moving image through a display provided therein, as well as transmit/receive audio data.

Figure 1:
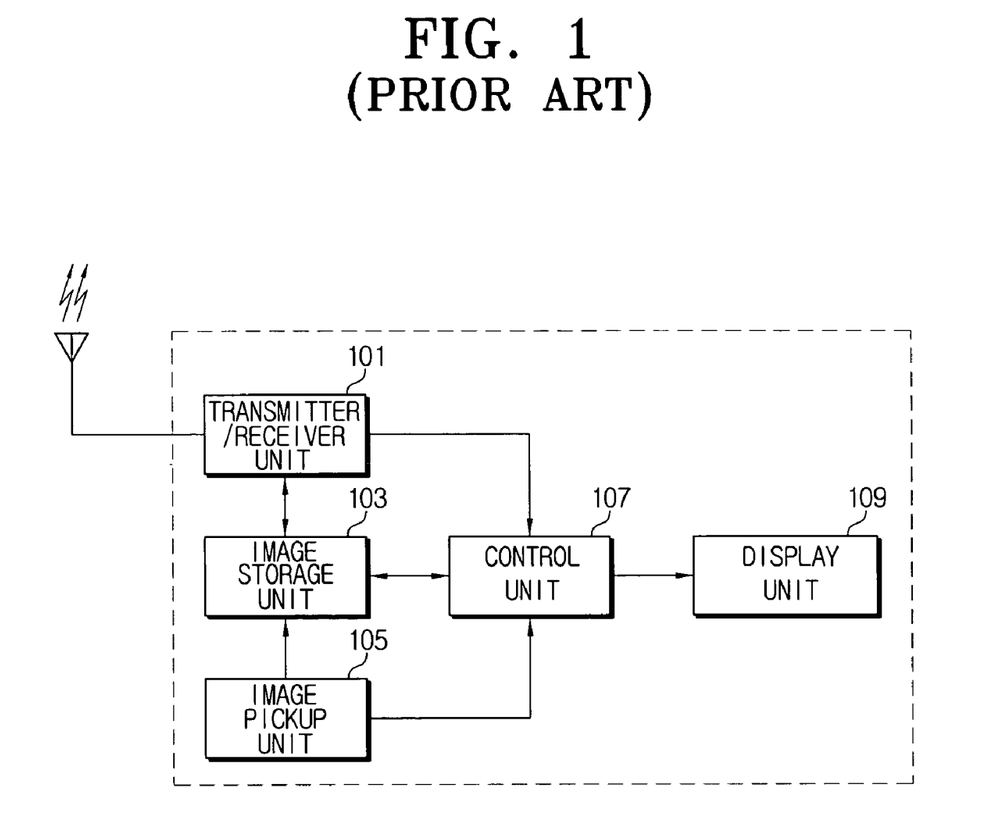
FIG. 1 is a block diagram schematically illustrating a general display device for a portable terminal.

FIG. 1 is a block diagram schematically illustrating a general display device for a portable terminal. Referring to FIG. 1, the display device for a portable terminal includes a transmitter/receiver unit 101, an image pickup unit 105, an image storage unit 103, a control unit 107, and a display unit 109.

The transmitter/receiver unit 101 transmits/receives data to/from an external appliance by wireless or by wire. The transmitter/receiver unit 101 transmits text data, a still image or a moving image among data received from the external appliance to the control unit 107, or stores the text data or the image in the image storage unit 103 in accordance with a user's storage command inputted through an input unit (not illustrated).

The image pickup unit 105 picks up a still image such as a photograph or a moving image according to a user's manipulation. The image pickup unit 105 transmits the picked-up still or moving image to the control unit 107, or stores the image in the image storage unit 103 according to a user's storage command inputted through the input unit.

Figure 2:
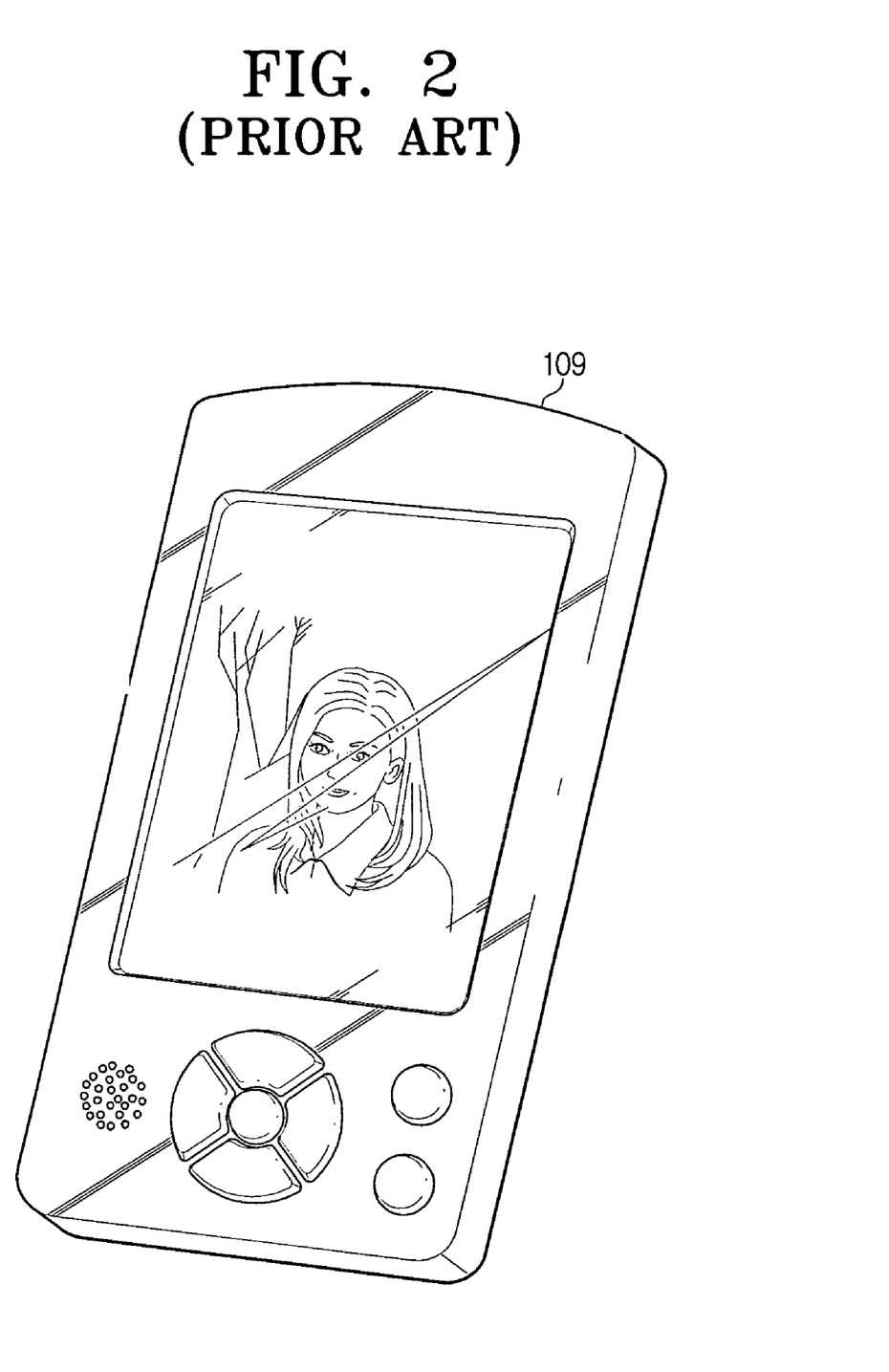
FIG. 2 is a view illustrating an example of an image displayed on a display unit of FIG. 1.

The control unit 107 decompresses and restores the still or moving image received from the external appliance through the transmitter/receiver unit 101 and displays the restored image on the display unit 109. Also, the control unit 107 compresses the still or moving image picked up by the image pickup unit 105 and stores the compressed image in the image storage unit 103 or transmits the compressed image to the external appliance through the transmitter/receiver unit 101. The control unit 107 also controls the display unit 109 to directly display the moving image picked up by the image pickup unit 107. An example of a still image being displayed on the display unit 109 is illustrated in FIG. 2.

The display device for a portable terminal as described above, however, has drawbacks in that, since it can display the still or moving image only in a predetermined direction on the display unit 109, the user should fix a position of the portable terminal only in one direction with respect to the user, in order for the user to view the still or moving image displayed on the display unit 109 as it is.

Also, in the case that the user hands the portable terminal over to a person in front of the user or by the side of the user, the user should consider that the direction of the portable terminal coincides with the position of the person for the convenience of the person.

SUMMARY OF THE INVENTION

An aspect of the present invention is to solve at least the above-identified problems and/or disadvantages and to provide at least the advantages described hereinafter.

Another aspect of the present invention is to provide a display device for a portable terminal that enables a user to view an upright image even though the portable terminal is rotated in any direction, i.e., in a front, rear, right or left direction.

To achieve the above aspects and/or other features of the present invention, there is provided a display device for a portable terminal comprising a display unit, a slope detection unit for detecting a slope of the display unit that is rotating in one direction among front, rear, right and left directions from its upright position, an image processing unit for processing an image to be displayed on the display unit, and a control unit for rotating the image processed by the image processing unit in accordance with the slope of the display unit detected by the slope detection unit, and displaying the rotating image on the display unit.

Here, the slope detection unit comprises a right/left rotation detection unit for detecting the slope of the display unit being rotated in the right or left direction based on the upright position of the display unit, and a front/rear rotation detection unit for detecting the slope of the display unit being rotated in the front or rear direction based on the upright position of the display unit.

Also, the display device for a portable terminal further comprises a storage unit for storing threshold values of the front, rear, right and left rotations of the display unit, and if the slope of the display unit detected by the right/left rotation detection unit exceeds the threshold value of the right/left rotation, the control unit rotates the image by 90° in a direction opposite to the rotating direction of the display unit. In this case, the control unit changes an aspect ratio of the rotating image, i.e., a ratio of a horizontal direction to a vertical direction of the rotating image, in accordance with an aspect ratio of the display unit in the horizontal and vertical directions. Also, the control unit rotates the image by 180° if the slope of the display unit detected by the front/rear rotation detection unit exceeds the threshold value of the front/rear rotation.

In another aspect of the present invention, there is provided a display device for a portable terminal comprising a display unit, a slope detection unit for detecting a slope of the display unit that is standing in one direction from a state that the display unit is put in a horizontal direction, an image processing unit for processing an image to be displayed on the display unit, and a control unit for rotating the image processed by the image processing unit in accordance with the slope of the display unit detected by the slope detection unit, and displaying the rotating image on the display unit.

In an exemplary embodiment, the display device for a portable terminal further comprises a storage unit for storing threshold values of the slope of the display unit. Here, if the slope of the display unit detected by the slope detection unit exceeds the threshold value, the control unit rotates the image so as to stand the image upright in a state that the display unit stands upright.

In an exemplary embodiment of the present invention, if the display unit stands in the right or left direction with respect to the image displayed on the display unit in the state that the display unit is put in the horizontal direction, the control unit rotates the image by 90° in a direction opposite to the standing direction of the display unit. Also, in an exemplary embodiment of the present invention, the control unit changes an aspect ratio of the rotating image in horizontal and vertical directions in accordance with an aspect ratio of the display unit in the horizontal and vertical directions.

Also, in an exemplary embodiment of the present invention, the control unit rotates the image by 180° if the display unit is standing in an opposite direction with respect to the image displayed on the display unit in the state that the display unit is put in the horizontal direction.

In still another aspect of the present invention, there is provided a display device for a portable terminal comprising a display unit, an input unit for inputting a rotation command for rotating an image displayed on the display unit in a direction selected among front, rear, right and left directions with respect to the displayed image, and a control unit for rotating the image in the selected direction and displaying the rotating image on the display unit if the rotation command is inputted through the input unit.

Here, in an exemplary embodiment of the present invention, if the right or left direction is selected with respect to the image displayed on the display unit, the control unit rotates the image by 90° in the selected direction in accordance with the rotation command.

In an exemplary embodiment of the present invention, the control unit changes an aspect ratio of the rotating image in horizontal and vertical directions in accordance with an aspect ratio of the display unit in the horizontal and vertical directions. Also, in an exemplary embodiment of the present invention, the control unit rotates the image by 180° in the selected direction in accordance with the rotation command if an opposite direction is selected with respect to the image displayed on the display unit.

Consequently, even though the portable terminal is rotated in any direction among the front, rear, right and left directions, the display device of the portable terminal enables a user to view an upright image.

BRIEF DESCRIPTION OF THE DRAWINGS

The above aspects and other advantages of the present invention will become more apparent by describing in detail the illustrative, non-limiting embodiments thereof with reference to the attached drawings in which.

DETAILED DESCRIPTION OF THE ILLUSTRATIVE, NON-LIMITING EMBODIMENTS

Now, a display device for a portable terminal according to illustrative, non-limiting embodiments of the present invention will be described in detail with reference to the annexed drawings in which like reference numerals refer to like elements.

Figure 3:
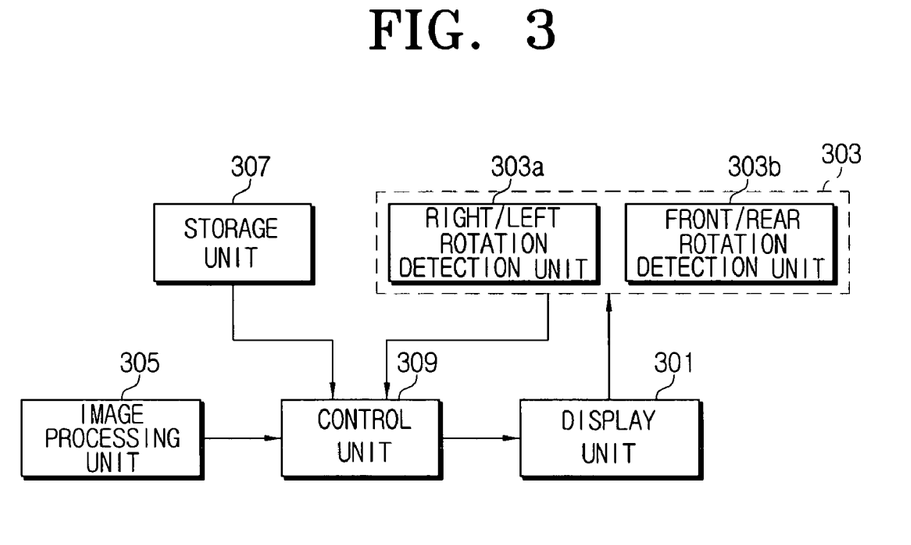
FIG. 3 is a block diagram schematically illustrating a display device for a portable terminal according to an embodiment of the present invention.

FIG. 3 is a block diagram schematically illustrating a display device for a portable terminal according to an embodiment of the present invention. Referring to FIG. 3, the display device for a portable terminal includes a display unit 301, a slope detection unit 303, an image processing unit 305, a storage unit 307, and a control unit 309. Here, the slope detection unit 303 is provided with a right/left rotation detection unit 303a and a front/rear rotation detection unit 303b.

The display unit 301 displays an image received through a transmitter/receiver unit (not illustrated) of the portable terminal or an image picked up by an image pickup unit (not illustrated). Such an image may comprise a text data image, a still image, and a moving image.

If the display unit 301 rotates in one direction among front, rear, right and left directions from its upright position, the slope detection unit 303 detects the slope of the rotating display unit 301. That is, the right/left rotation detection unit 303a provided in the slope detection unit 303 detects the slope of display unit 301 being rotated in the right or left direction based on the upright position of the display unit 301, and the front/rear rotation detection unit detects the slope of the display unit being rotated in the front or rear direction based on the upright position of the display unit 301.

Figure 4:
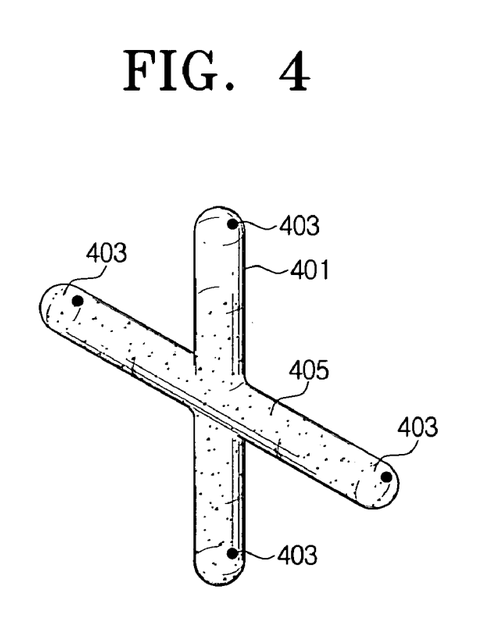
FIG. 4 is a front view illustrating an example of a slope detection unit of FIG. 3.

FIG. 4 is a front view illustrating an example of a slope detection unit of FIG. 3. Referring to FIG. 4, the slope detection unit 303 is provided with a cross-shaped glass tube 401, air detection sensors 403 respectively installed in four end portions of the cross-shaped glass tube, and a liquid 405 filled in the tube. In an exemplary embodiment, the four members of the cross-shaped glass tube 401 have the same length. Also, in an exemplary embodiment of the present invention, the slope detection unit 303 is installed so that the cross-shaped glass tube coincides with vertical and horizontal axes of the display unit 301.

As shown in FIG. 4, three of the air detection sensors 403 installed in the end portions of the cross-shaped glass tube are submerged in the fluid, and one of the air detection sensors 403 is exposed to the air. That is, the slope detection unit 303 detects the slope of the display unit 301 using gravity, and the direction of the sensor that is exposed to the air corresponds to the upper end of the rotating display unit 301. If the display unit 301 rotates in the right or left direction, the sensor of the right or left direction of the slope detection unit 303 is exposed to the air, while the sensor previously exposed to the air is submerged in the fluid. Also, if the display unit 301 rotates by 180° in the right or left direction or in the front or rear direction, the sensor installed in the lower end portion of the cross-shaped glass tube is exposed to the air, while the sensor installed in the upper end portion is submerged in the fluid. Through the above-described operation of the sensors, the slope detection unit 303 can detect that the display unit rotates in the right or left direction.

As described above, the slope detection unit 303 comprises the slope detection sensors using gravity and fluid, but is not limited thereto. The slope detection unit 303 may be implemented using diverse sensors, such as electronic slope detection sensors or slope detection sensors using pendulums.

The image processing unit 305 processes an image to be displayed on the display unit 301. That is, the image processing unit 305 performs a decompression and restoring of the image received through the transmitter/receiver unit of the portable terminal.

The storage unit 307 stores threshold values of the front, rear, right and left rotations of the display unit 301. Here, the threshold value of the right or left rotation means the threshold value in an allowable range where the image displayed on the display unit 301 is maintained without rotating the image when the display unit 301 is sloped in the right or left direction from its upright position. Also, the threshold value of the front or rear rotation means the threshold value in an allowable range where the image displayed on the display unit 301 is maintained without rotating the image, when the display unit 301 is sloped in the front or rear direction from its upright position. In an exemplary embodiment of the present invention, the threshold values of the right and left rotations stored in the storage unit 307 are set to about 45° in consideration of the viewing angle of a user who views the image displayed on the display unit 301. Here, the threshold values of the front, rear, right and left directions may be stored in the storage unit 307, or may be set as values at a time point when a sensor exposed to the air is submerged in the fluid in the slope detection unit 301. In this case, the time point when the sensor exposed to the air is submerged in the fluid can be adjusted by the amount of fluid filled in the cross-shaped glass tube.

The control unit 309 rotates the image processed by the image processing unit 305 in accordance with the slope of the display unit detected by the slope detection unit 303, and displays the rotating image on the display unit 301. At this time, if the slope of the display unit 301 detected by the right/left rotation detection unit 303a of the slope detection unit 303 exceeds the threshold value of the right/left rotation stored in the storage unit 307, the control unit 309 rotates the image by 90° in a direction opposite to the rotating direction of the display unit 301.

Figure 5A:
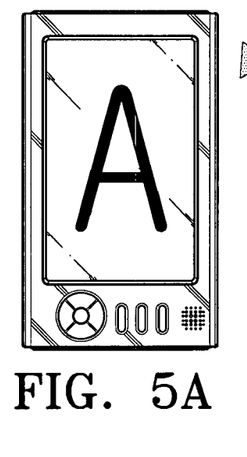
FIGS. 5A to 5D are views of the display device of FIG. 3 explaining the rotation of a displayed image.
Figure 5B:
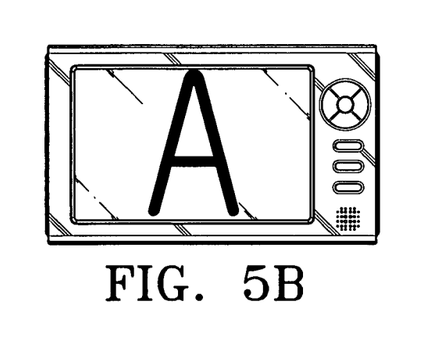
Figure 5C:
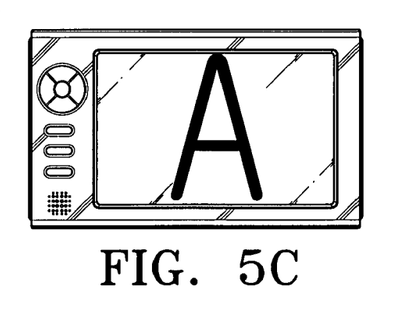
Figure 5D:
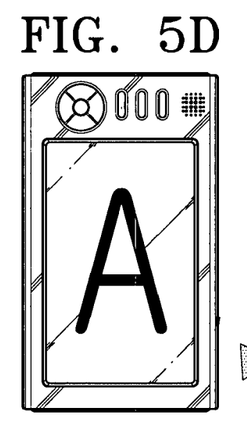

FIGS. 5A to 5D are views of the display device of FIG. 3 explaining the rotation of a displayed image. That is, FIG. 5A shows the case that the display unit 301 is upright, and FIG. 5B shows the case that the display unit 301 rotates by 90° in the left direction from its upright position. Also, FIG. 5C shows the case that the display unit 301 rotates by 90° in the right direction from its upright position. As shown in FIGS. 5B and 5C, if the display unit 301 rotates in the left or right direction, the control unit rotates the image displayed on the display unit 301 in the opposite direction to the rotating direction of the display unit 301, and displays the rotating image on the display unit 301. In an exemplary embodiment of the present invention, the control unit 309 changes the aspect ratio of the rotating image in horizontal and vertical directions in accordance with the aspect ratio of the display unit in the horizontal and vertical directions. That is, if the aspect ratio of the screen of the display unit 301 in the horizontal and vertical directions is 2:3, the control unit 309 cross-changes the aspect ratio of the image in accordance with the rotation of the display unit 301.

Also, if the display unit 301 rotates over the threshold value of front, rear, right or left rotation in the front, rear, right or left direction, the control unit 309 rotates the displayed image by 180° from its upright position. As a result, even though the user rotates the portable terminal in the front, rear, right or left direction or hands the portable terminal over to another person in a state that the portable terminal is rotated in the front, rear, right or left direction, the user or the person can view the upright image displayed on the display unit 301.

Figure 6:
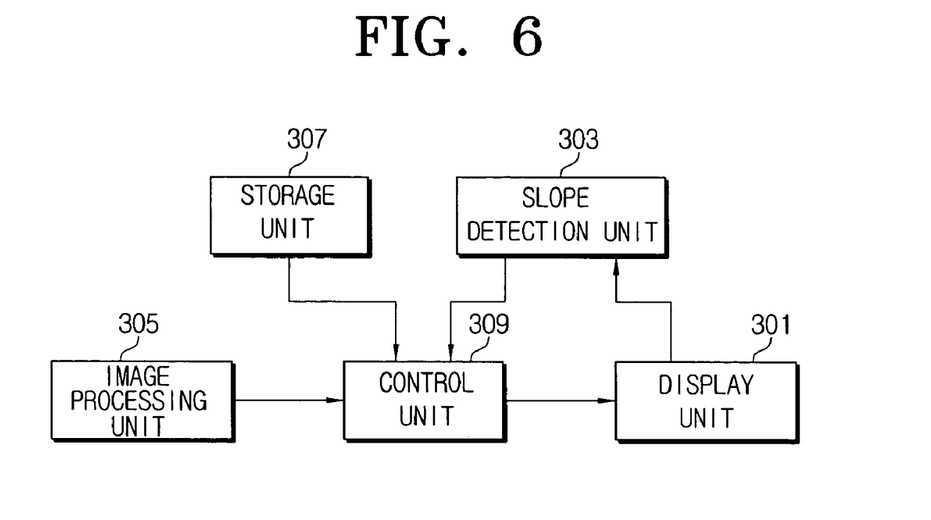
FIG. 6 is a block diagram schematically illustrating a display device for a portable terminal according to another embodiment of the present invention.

FIG. 6 is a block diagram schematically illustrating a display device for a portable terminal according to another embodiment of the present invention. Referring to FIG. 6, the display device includes a display unit 301, a slope detection unit 303, an image processing unit 305, a storage unit 307 and a control unit 309.

Here, since the constituent elements are the same as those of FIG. 3 in construction and effect, the same reference numerals are used, and the explanation thereof will be omitted.

Figure 7:
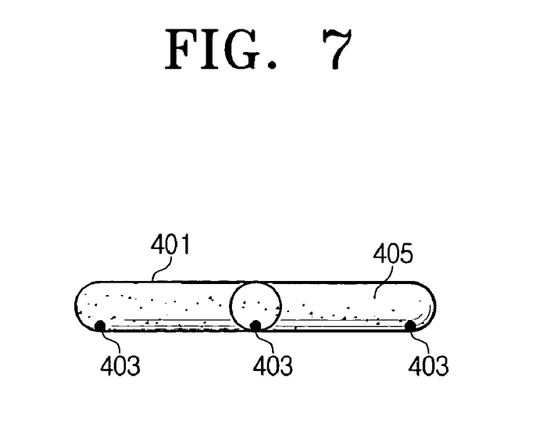
FIG. 7 is a side view illustrating an example of a slope detection unit of FIG. 6.

FIG. 7 is a side view illustrating an example of a slope detection unit of FIG. 6. Here, the construction of the slope detection unit 303 and the installation type of the display unit 301 are the same as those of FIG. 4. However, in this embodiment, respective sensors installed inside the glass tube 401 of the slope detection unit 303 are installed in the respective end portions of the cross-shaped glass tube 401 and on the same surface, i.e., on the upper surface or the lower surface. FIG. 7 shows the sensors installed on the lower surface inside the glass tube 401.

If the display unit 301 is horizontally placed, the respective sensors installed inside the slope detection unit 303 are all submerged in the fluid or all exposed to the air. At this time, the case that all the sensors are submerged in the fluid means that the display unit is horizontally placed with its screen facing upward, while the case that all the sensors are exposed to the air means that the display unit is horizontally placed with its screen facing downward.

If the display unit 301 stands in a direction from the state that it is horizontally placed with its screen downward or upward, three of the sensors of the slope detection unit 303 are submerged in the fluid, and one of the sensors is exposed to the air. Accordingly, the slope detection unit 303 detects the slope of the standing display unit 301.

Figures 8A, 8B:
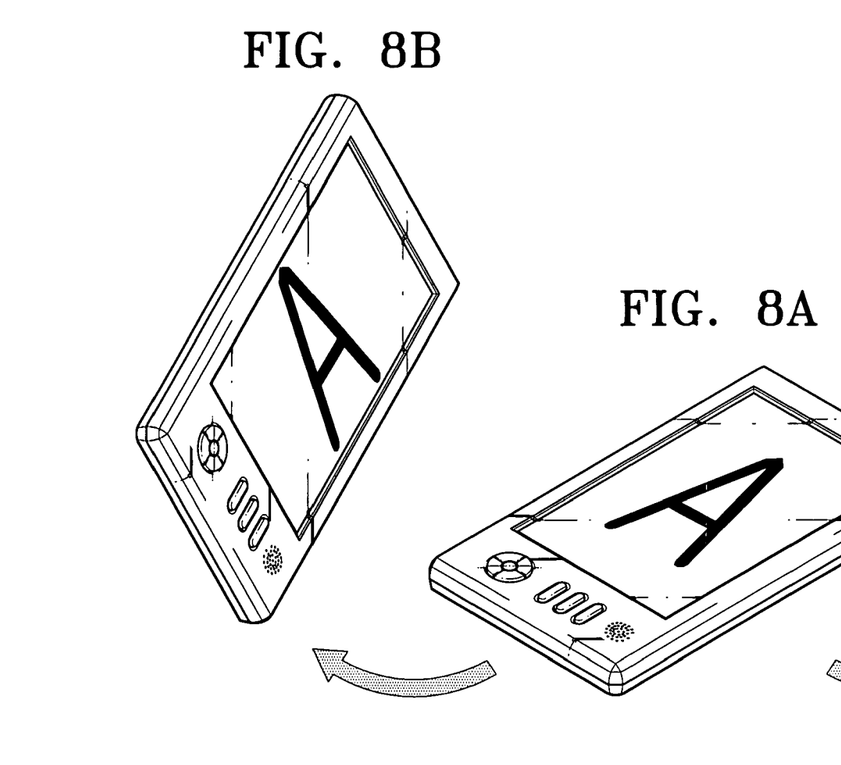
FIGS. 8A to 8C are views of the display device of FIG. 6 explaining the rotation of a displayed image.
Figure 8C:
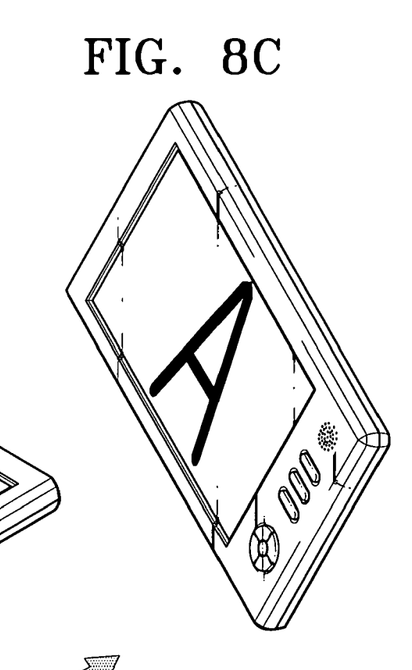

In the storage unit 307, threshold values of the slope of the display unit 301 are stored. If the display unit 301 is standing in the left or right direction with respect to the image displayed on the screen of the display unit 301, the slope detected by the slope detection unit 303 exceeds the threshold value stored in the storage unit 307, and thus the control unit 309 rotates the image displayed on the display unit 301 horizontally placed, so that the image stands upright in a state that the display unit 301 is in a standing state. In this case, as described above, the control unit 309 rotates the image by 90°, and displays the rotating image on the display unit 301. At the same time, the aspect ratio of the image in the horizontal and vertical directions is cross-changed in accordance with the aspect ratio of the display unit 301 in the horizontal and vertical directions. In FIGS. 8A to 8C, the rotating images in the state that the display unit 301 is standing in the left or right direction with respect to the image displayed on the screen are illustrated.

Also, if the display unit 301 is standing in the opposite direction with respect to the image displayed on the screen, the slope detected by the slope detection unit 303 exceeds the threshold value stored in the storage unit 307, and thus the control unit 309 rotates by 180°, so that the image stands upright with respect to the oppositely standing display unit.

Figure 9:
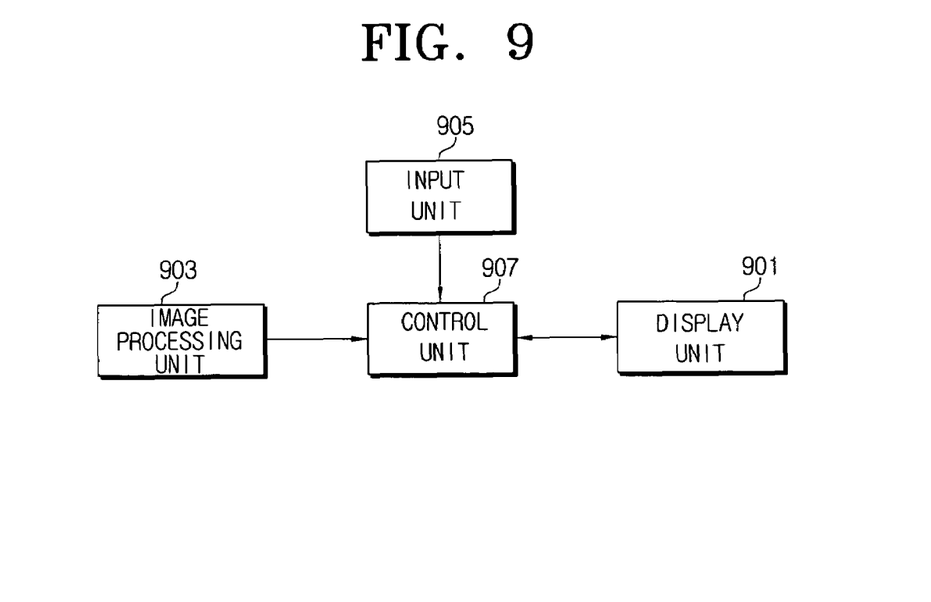
FIG. 9 is a block diagram schematically illustrating a display device for a portable terminal according to still another embodiment of the present invention.

FIG. 9 is a block diagram schematically illustrating a display device for a portable terminal according to another exemplary embodiment of the present invention. Referring to FIG. 9, the display device for a portable terminal includes a display unit 901, an image processing unit 903, an input unit 905, and a control unit 907.

The display unit 901 displays an image received through a transmitter/receiver unit (not illustrated) of the portable terminal or an image picked up by an image pickup unit (not illustrated). Such an image may comprise a text data image, a still image, and a moving image.

The image processing unit 903 processes an image to be displayed on the display unit 901. That is, the image processing unit 903 performs a decompression and restoring of the image received through the transmitter/receiver unit of the portable terminal.

The input unit 905 inputs a rotation command for selecting a direction among right, left and opposite directions with respect to the image displayed on the display unit 903 and rotating the image in the selected direction.

The control unit 907, if the rotation command is inputted through the input unit 905, rotates the image in the selected direction and displays the rotating image on the display unit 901. In this case, if the left or right direction is selected with respect to the image displayed on the display unit 901, the control unit 907 rotates the image by 90° in the selected direction in accordance with the rotation command inputted through the input unit 905, and displays the rotating image on the display unit 901. Also, in the case of rotating the image displayed on the display unit 901 by 90°, the control unit 907 cross-changes the aspect ratio of the image in the horizontal and vertical directions in accordance with the aspect ratio of the display unit 901 in the horizontal and vertical directions.

Figure 10:
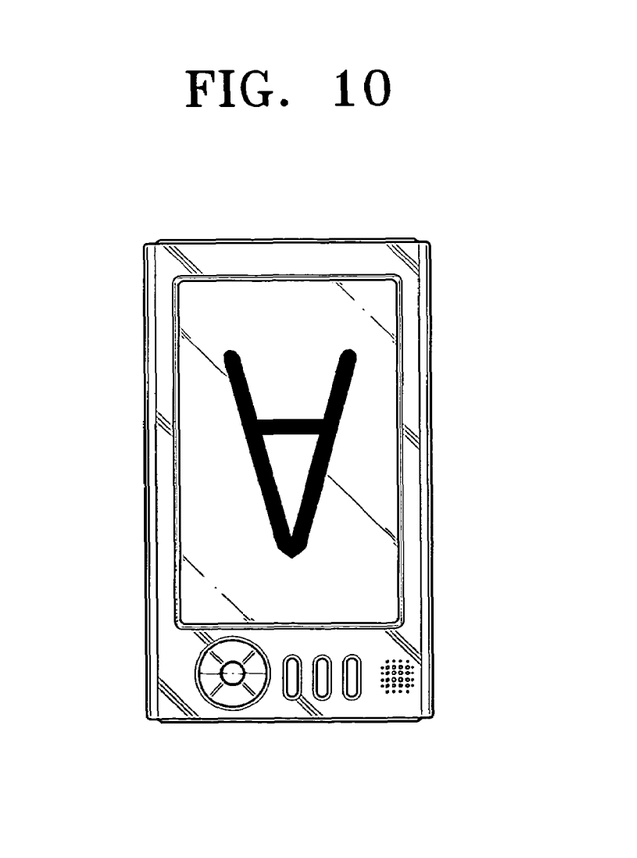
FIG. 10 is a view illustrating a display unit of FIG. 6.

Also, if the opposite direction is selected with respect to the image displayed on the display unit 901, the control unit 907 rotates the image by 180° in the selected direction in accordance with the rotation command inputted through the input unit 905, and displays the rotating image on the display unit 901. FIG. 10 shows an example of the display unit 901 having selection keys in north, south, east and west directions so as to select the rotating direction of the image displayed on the display unit 901. In FIG. 10, the image displayed on the display unit 901 is an image standing upside down according to the selection of the opposite direction.

As described above, according to the present invention, the display device for a portable terminal can display an image to match the viewing angle of a user in accordance with the position of the user who views the display unit, and thus the convenience of the user of the portable terminal can be maximized.

While the present invention has been described in detail, it should be understood that various changes, substitutions and alterations can be made hereto without departing from the spirit and scope of the invention as defined by the appended claims.

What is claimed is:

1. A display device for a portable terminal comprising:
   a display unit;
   a slope detection unit configured to detect a slope of the display unit that is rotated in one direction among front, rear, right and left directions from its upright position;
   an image processing unit configured to process an image to be displayed on the display unit; and
   a control unit configured to rotate the image processed by the image processing unit in accordance with the slope of the display unit detected by the slope detection unit, and display the rotating image on the display unit, wherein the entire image processed by the image processing unit rotates in a direction opposite to the rotation of the display unit.

2. The display device as claimed in claim 1, wherein the slope detection unit comprises:
   a right/left rotation detection unit for detecting the slope of the display unit being rotated in the right or left direction based on the upright position of the display unit; and
   a front/rear rotation detection unit for detecting the slope of the display unit being rotated in the front or rear direction based on the upright position of the display unit.

3. The display device as claimed in claim 2, further comprising a storage unit configured to store threshold values of the right and left rotations of the display unit;
   wherein if the slope of the display unit detected by the right/left rotation detection unit exceeds a first threshold value of the right/left rotation, the control unit rotates the image by 90° in a direction opposite to the rotating direction of the display unit.

4. The display device as claimed in claim 3, wherein the control unit changes an aspect ratio of the rotating image in horizontal and vertical directions of the rotating image in accordance with an aspect ratio of the display unit in the horizontal and vertical directions.

5. The display device as claimed in claim 2, further comprising a storage unit configured to store threshold values of the front and rear rotations of the display unit;
   wherein the control unit rotates the image by 180° if the slope of the display unit detected by the front/rear rotation detection unit exceeds a first threshold value of the front/rear rotation.

6. A display device for a portable terminal comprising:
   a display unit;
   a slope detection unit configured to detect a slope of the display unit that is rotated in one direction among front, rear, right and left directions from its upright position;
   an image processing unit configured to process an image to be displayed on the display unit; and
   a control unit configured to rotate the image processed by the image processing unit in accordance with the slope of the display unit detected by the slope detection unit, and display the rotating image on the display unit, wherein the slope detection unit comprises:
   a cross-shaped enclosure partially filled with a liquid; and
   an air detection sensor disposed in each end portion of the cross-shaped enclosure.

7. The display device as claimed in claim 6, wherein each leg of the cross-shaped enclosure has a same length.

8. The display device as claimed in claim 6, wherein the slope detection unit is disposed so that the cross-shaped enclosure coincides with horizontal and vertical axes of the display unit.

9. A display device for a portable terminal comprising:
a display unit;
a slope detection unit configured to detect a slope of the display unit that is standing in one direction from a state in which the display unit is placed in a horizontal direction;
an image processing unit configured to process an image to be displayed on the display unit; and
a control unit configured to rotate the image processed by the image processing unit in accordance with the slope of the display unit detected by the slope detection unit, and display the rotating image on the display unit, wherein the entire image processed by the image processing unit rotates in a direction opposite to the rotation of the display unit.

10. The display device as claimed in claim 9, further comprising a storage unit configured to store threshold values of the slope of the display unit;
wherein if the slope of the display unit detected by the slope detection unit exceeds a first threshold value, the control unit rotates the image so as to stand the image upright in a state that the display unit stands upright.

11. The display device as claimed in claim 10, wherein if the display unit stands in the right or left direction with respect to the image displayed on the display unit in the state that the display unit is in the horizontal direction, the control unit rotates the image by 90° in a direction opposite to the standing direction of the display unit.

12. The display device as claimed in claim 11, wherein the control unit changes an aspect ratio of the rotating image in horizontal and vertical directions in accordance with an aspect ratio of the display unit in the horizontal and vertical directions.

13. The display device as claimed in claim 10, wherein the control unit rotates the image by 180° if the display unit is standing in an opposite direction with respect to the image displayed on the display unit in the state that the display unit is placed in the horizontal direction.

14. A display device for a portable terminal comprising:
a display unit;
a slope detection unit configured to detect a slope of the display unit that is standing in one direction from a state in which the display unit is placed in a horizontal direction;
an image processing unit configured to process an image to be displayed on the display unit; and
a control unit configured to rotate the image processed by the image processing unit in accordance with the slope of the display unit detected by the slope detection unit, and display the rotating image on the display unit, wherein the slope detection unit comprises:
a cross-shaped enclosure partially filled with a liquid; and
an air detection sensor disposed in each end portion of the cross-shaped enclosure.

15. The display device as claimed in claim 14, wherein each leg of the cross-shaped enclosure has a same length.

16. The display device as claimed in claim 14, wherein the slope detection unit is disposed so that the cross-shaped enclosure coincides with horizontal and vertical axes of the display unit.

17. A display device for a portable terminal comprising:
a display unit;
an input unit configured to input a rotation command for rotating an image displayed on the display unit in a direction selected among front, rear, right and left directions with respect to the displayed image; and
a control unit configured to rotate the image in the selected direction and display the rotating image on the display unit if the rotation command is inputted through the input unit, wherein the entire image processed by the image processing unit rotates in a direction opposite to the rotation of the display unit.

18. The display device as claimed in claim 17, wherein if the right or left direction is selected with respect to the image displayed on the display unit, the control unit rotates the image by 90° in the selected direction in accordance with the rotation command.

19. The display device as claimed in claim 18, wherein the control unit changes an aspect ratio of the rotating image in horizontal and vertical directions in accordance with an aspect ratio of the display unit in the horizontal and vertical directions.

20. The display device as claimed in claim 17, wherein the control unit rotates the image by 180° in the selected direction in accordance with the rotation command if an opposite direction is selected with respect to the image displayed on the display unit.

21. An apparatus, comprising:
a slope detection unit configured to detect a deviation in a slope of a display unit from an upright position; and
a control unit configured to rotate an image to be displayed on the display unit in accordance with the deviation in slope detected by the slope detector, wherein the entire image processed by the image processing unit rotates in a direction opposite to the rotation of the display unit.

22. An image rotating unit comprising:
a slope detection unit configured to detect a slope of a display unit that is rotated in one direction among front, rear, right and left directions from its upright position;
a control unit configured to rotate an image to be displayed on the display unit in accordance with the slope of the display unit detected by the slope detection unit, wherein the slope detection unit comprises:
a cross-shaped enclosure partially filled with a liquid; and
an air detection sensor disposed in each end portion of the cross-shaped enclosure.

* * * * *